(12) United States Patent  
Lawson

(10) Patent No.: US 10,124,656 B2
(45) Date of Patent: Nov. 13, 2018

(54) PICKUP TRUCK BED COVER

(71) Applicant: Mark Lawson, Cochrane (CA)

(72) Inventor: Mark Lawson, Cochrane (CA)

( * ) Notice: Subject to any disclaimer, the term of this patent is extended or adjusted under 35 U.S.C. 154(b) by 194 days.

(21) Appl. No.: 15/406,846

(22) Filed: Jan. 16, 2017

(65) Prior Publication Data
US 2018/0201105 A1   Jul. 19, 2018

(51) Int. Cl.
B60J 7/14    (2006.01)
B60J 7/19    (2006.01)
F16M 13/02   (2006.01)

(52) U.S. Cl.
CPC ............. B60J 7/141 (2013.01); B60J 7/196 (2013.01); F16M 13/02 (2013.01)

(58) Field of Classification Search
CPC ..... B60J 7/14; B60J 7/141; B60J 7/196; B60J 7/198
USPC ............... 296/26.03, 26.08, 26.09, 26.12
See application file for complete search history.

(56) References Cited

U.S. PATENT DOCUMENTS

| 2,278,450 | A | * | 4/1942 | Jones | B60F 5/003 296/19 |
| 3,245,714 | A | * | 4/1966 | Blair | B60P 3/42 296/184.1 |
| 3,415,567 | A | * | 12/1968 | McChesney | B60P 3/055 296/26.13 |
| 3,447,826 | A | * | 6/1969 | Gostomski | B60R 19/04 280/500 |
| 3,797,880 | A | * | 3/1974 | Pezzaglia | B60P 3/34 296/26.13 |
| 4,313,636 | A | | 2/1982 | Deeds | |
| 4,358,133 | A | * | 11/1982 | Stucky | B60P 3/066 180/9.48 |
| 4,444,427 | A | | 4/1984 | Martin | |
| 4,946,217 | A | | 8/1990 | Steffens et al. | |
| 4,951,991 | A | | 8/1990 | Haigler | |
| 5,087,093 | A | | 2/1992 | Repetti | |
| 5,110,021 | A | | 5/1992 | Dawson, Jr. | |
| 5,190,337 | A | | 3/1993 | McDaniel | |
| 5,961,173 | A | | 10/1999 | Repetti | |
| 6,565,141 | B1 | | 2/2003 | Steffens et al. | |
| 6,746,040 | B2 | * | 6/2004 | Bordeleau | B62D 63/061 280/656 |
| 6,843,626 | B1 | | 1/2005 | Falconer | |
| 7,201,453 | B2 | * | 4/2007 | Vandewinckel | B62D 33/02 296/10 |
| 7,320,494 | B1 | | 1/2008 | Wilson | |

(Continued)

Primary Examiner — Hilary L Gutman
(74) Attorney, Agent, or Firm — Stephen Lewellyn; Lewellyn Law, PLLC

(57) ABSTRACT

A truck bed cover for covering the bed of a pickup truck includes a plurality of rigid panel sections that extend across the truck bed and selectively supported upon the top edges of the truck bed sidewalk. Adjacent rigid panel sections are hingedly connected such that two or more rigid panel sections of said plurality of rigid panel sections are pivotable about axes perpendicular to the sidewalls of the bed between a closed position where the bed is covered and an open position where the bed is open. The rigid panel sections are constructed to be load bearing and provide a deck surface for carrying articles above the truck bed. Deck surface extensional panels are removably attachable to extend the deck surface beyond the sides and rear of the truck bed.

10 Claims, 11 Drawing Sheets

(56) References Cited

U.S. PATENT DOCUMENTS

| | | | | |
|---|---|---|---|---|
| 7,506,909 B2* | 3/2009 | Barnes | ................... | B62D 21/14 |
| | | | | 296/26.12 |
| 7,628,439 B1* | 12/2009 | Strong | ............... | B62D 33/0273 |
| | | | | 108/44 |
| 8,162,367 B2 | 4/2012 | Kuklok | | |
| 8,328,263 B1* | 12/2012 | Alexander | .............. | B60R 5/041 |
| | | | | 296/26.09 |
| 8,496,281 B2* | 7/2013 | Thygesen | .............. | B62D 33/08 |
| | | | | 296/26.12 |
| 8,550,527 B1 | 10/2013 | Win | | |
| 8,991,894 B2 | 3/2015 | Smith et al. | | |
| 9,039,066 B1 | 5/2015 | Yue | | |
| 9,487,070 B2 | 11/2016 | Xu | | |
| 10,041,296 B2* | 8/2018 | Anh | .......................... | E06C 5/04 |
| 2002/0145299 A1 | 10/2002 | Henderson | | |
| 2003/0047958 A1* | 3/2003 | Yarbrough | ............... | B60J 7/141 |
| | | | | 296/100.06 |
| 2007/0170740 A1* | 7/2007 | Di Franco | ................. | B60P 3/34 |
| | | | | 296/26.13 |
| 2007/0222247 A1* | 9/2007 | Jaeck | ........................ | B60P 3/14 |
| | | | | 296/26.02 |
| 2010/0140973 A1* | 6/2010 | Duncan | ................... | B60J 7/141 |
| | | | | 296/100.09 |
| 2011/0260486 A1* | 10/2011 | Thygesen | .............. | B62D 33/02 |
| | | | | 296/26.09 |
| 2012/0049567 A1 | 3/2012 | Spanjers | | |
| 2013/0175820 A1* | 7/2013 | Lepage | ..................... | B60P 3/40 |
| | | | | 296/26.08 |
| 2014/0197653 A1 | 7/2014 | Stepanians | | |
| 2015/0246696 A1 | 8/2015 | Froling et al. | | |
| 2016/0340949 A1* | 11/2016 | Xu | ............................ | E05D 5/14 |
| 2018/0201107 A1* | 7/2018 | Lawson | ................... | B60J 7/141 |

\* cited by examiner

US 10,124,656 B2

PICKUP TRUCK BED COVER

FIELD OF THE INVENTION

The present invention relates generally to pickup truck bed covers, and more particularly, relating to a modular and loading supporting pickup truck bed cover.

BACKGROUND OF THE INVENTION

Truck bed covers are commonly used to cover the bed of a pickup truck to protect articles disposed within the bed and to improve the aesthetic appearance of the truck. Generally, there are two types of truck bed covers. The first being a soft cover that is constructed of fabric material and the second being a hard cover made of rigid material. The hard cover type may be comprised of several panels that are hinged together in a manner that allows the cover to be folded to cover and uncover the truck bed.

While the truck bed covers heretofore fulfill their respective requirements and objectives, a need remains for a new truck bed cover that is foldable, loaded supporting, and has an extendable deck surface.

SUMMARY OF THE INVENTION

The present invention provided a new truck bed cover having many advantages over existing truck bed covers. More specifically, embodiments of the truck bed cover provide a rigid, foldable load supporting deck surface for transporting articles upon the deck surface, above the truck bed. In other embodiments, the truck bed cover includes side extensional panels that provide an extended deck surface beyond the sides of the truck bed. In other embodiment, the truck bed cover further includes a rear extension panel that provides an extended deck surface beyond the rear of the truck bed.

There has thus been outlined, rather broadly, the more important features of the invention in order that the detailed description thereof that follows may be better understood and in order that the present contribution to the art may be better appreciated.

Numerous objects, features and advantages of the present invention will be clear to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

Figure 1:
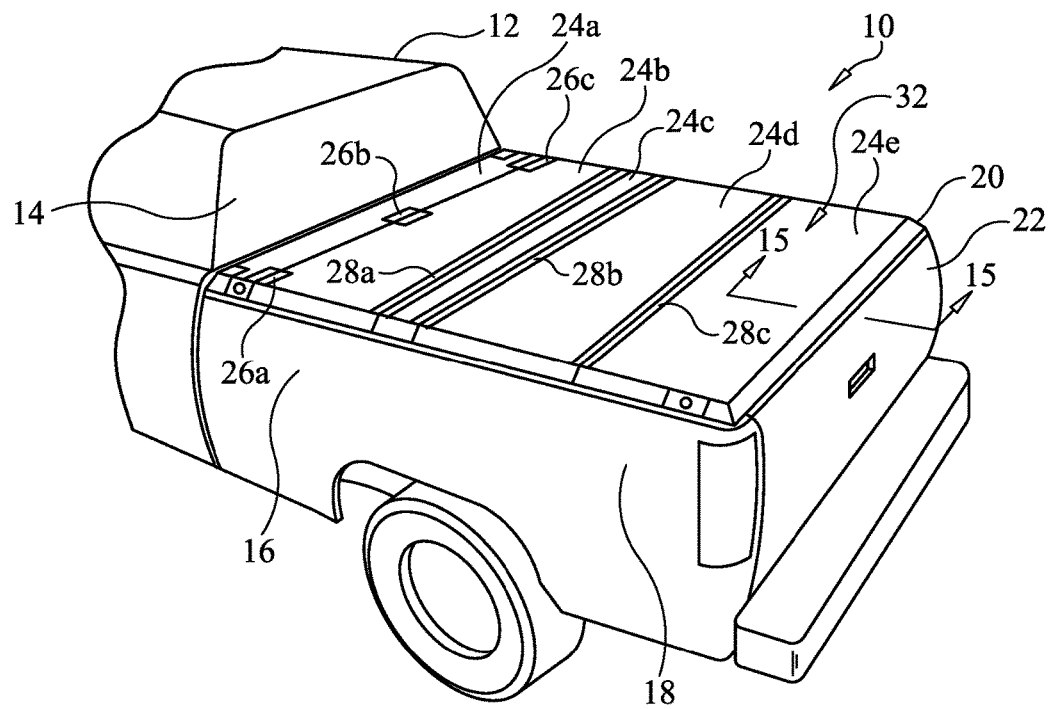
FIG. 1 is a perspective view of a truck bed cover constructed in accordance with an embodiment of the present invention, showing the cover in a closed. configuration.
Figure 2:
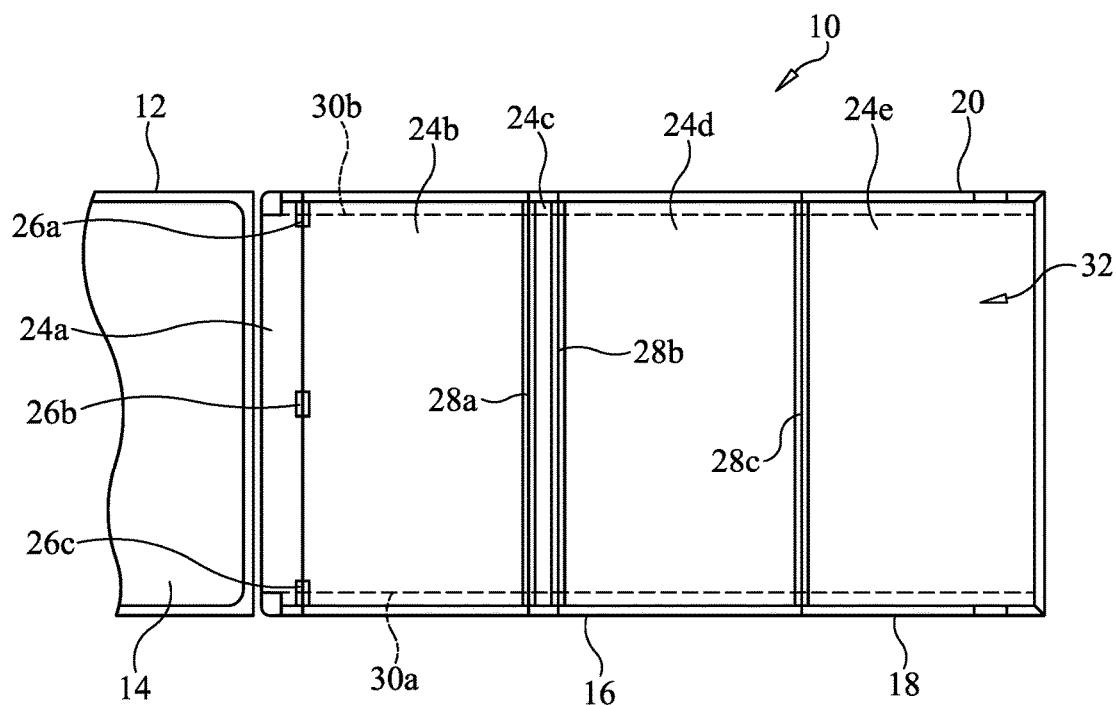
FIG. 2 is a top view of the truck bed cover shown in an extended configuration.

With reference to FIGS. 1 and 2, there is representatively illustrated a load supporting, folding truck bed cover 10 according to an embodiment of the invention. Cover 10 is used with a conventional pickup truck 12 having a passenger cab 14 and a truck bed 16 having sidewalls 18 and 20, and a tailgate 22. As depicted, the cover 10 is mounted to the truck bed 16 and is positioned in an extended or closed configuration where the cargo area of the truck bed is covered. The cover 10 includes a plurality of rigid panel sections 24a-24e that extend across and collectively cover truck bed 16. Alternatively, the cover 10 could include fewer or more panel sections as desired.

Each panel 24a-24e has lateral sides and a width that extends between the lateral sides, The panels 24a-24e are selectively positioned on the upper edges 30a and 30b of the sidewalls 18 and 20, respectively, such that the width of each panel section extends across the bed 16 and across at least a portion of each upper edge of the sidewalls. In the depicted, closed configuration, each panel 24a-24e are supported at their opposite lateral sides upon the upper edges 30a and 30b of the truck bed sidewalk 18 and 20 Further, each panel 24a-24e is constructed to be loading supporting and, in the closed configuration, provide a load supporting deck surface 32. The deck surface 32 can be used to transport various articles, such as, for example one or more snowmobiles, as further described below.

In the depicted embodiment, panel 24a is the forward most positioned panel and is nearest the cab 14. As further described below, panel 24a is a stationary panel that is fixedly secured to the truck bed 16. Panel 24b is pivotally connected to panel 24a by a hinge system including hinges 26a, 26b, and 26c. Similarly, panel 24c is pivotally connected to panel 24b by hinge 28a, panel 24d is pivotally connected to panel 24c by hinge 28b, and panel 24e is pivotally connected to panel 24d by hinge 28c, Hinge pins 26a, 26b, and 26c are configured such that their pins can be removed thereby allowing panel 24b, along with panels 24c-24e, to be detached from panel 24a and removed from the truck bed.

Figure 3A:
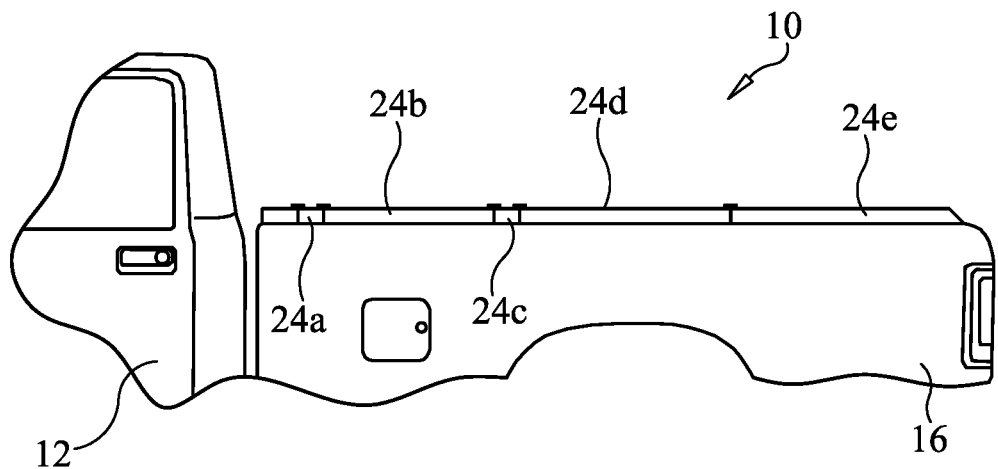
FIG. 3A is a side view of the truck bed cover shown in an extended position.
Figure 3B:
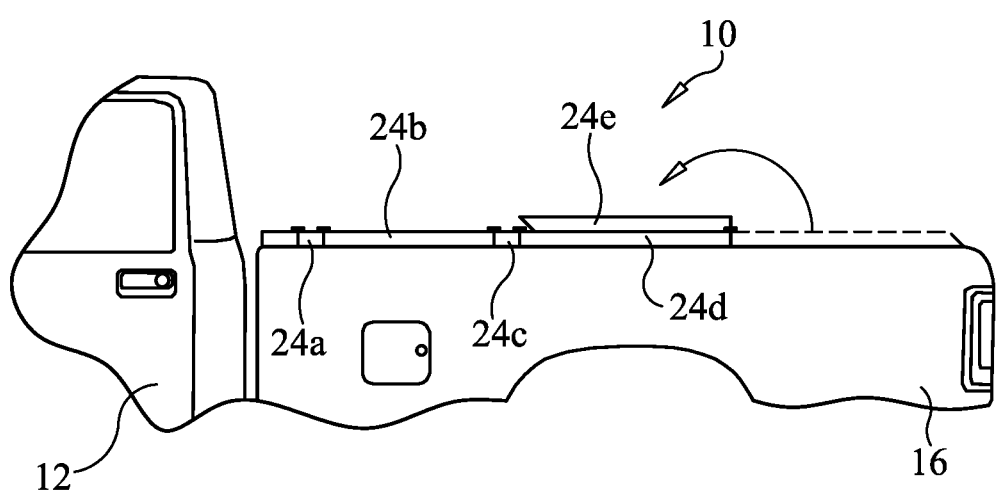
FIG. 3B is a side view of the truck bed cover shown in a first folded position.
Figure 3C:
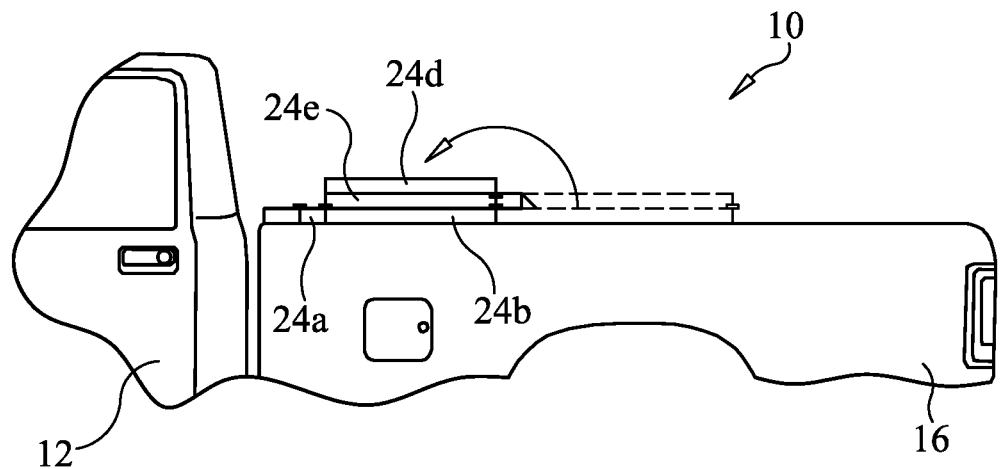
FIG. 3C is a side view of the truck bed cover shown in a second folded position.
Figure 3D:
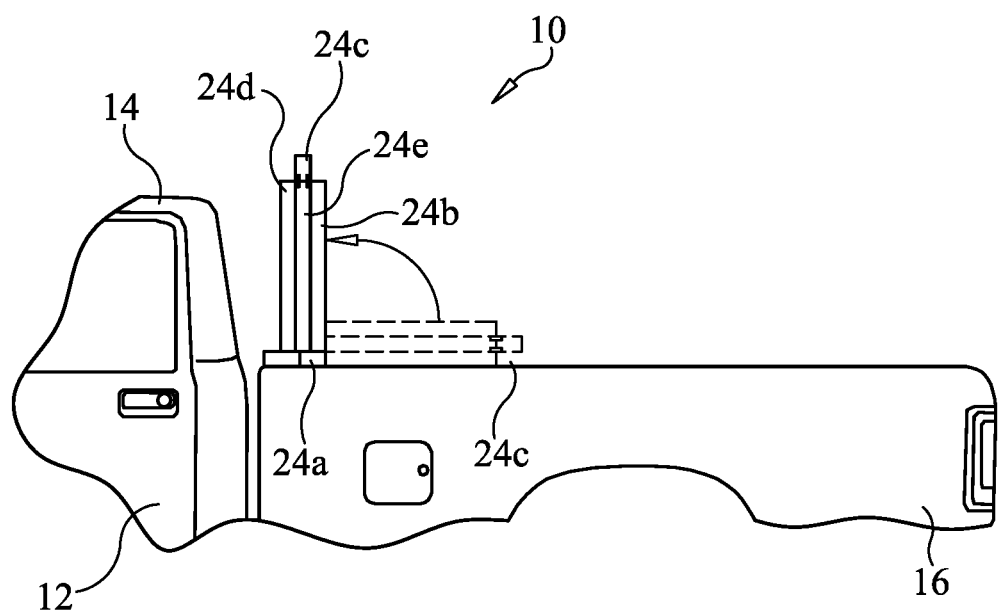
FIG. 3D is a side view of the truck bed cover shown in a retracted position.

FIGS. 3A through 3D, the cover 10 is shown in successive, fold positions between an extended configuration where the truck bed 16 is completely covered and an open position where the truck bed is opened and the cover is stored, in a vertical position, behind the truck cab 14. Particularly, FIG. 3A shows the cover 10 in the unfolded, extended position and completely covering the truck bed cargo area. In FIG. 3B, panel 24e is shown folded over upon panel 24d. In FIG. 3C, panels 24e and 24d are folded together over upon panel 24b and panel 24c providing a space between panels 24d and 24b to permit panel 24e to be disposed been them. In FIG. 3D, panels 24b-24e are folded over panel 24a in a vertical orientation relative to panel 24 to be disposed behind the truck cab 14.

Figure 4:
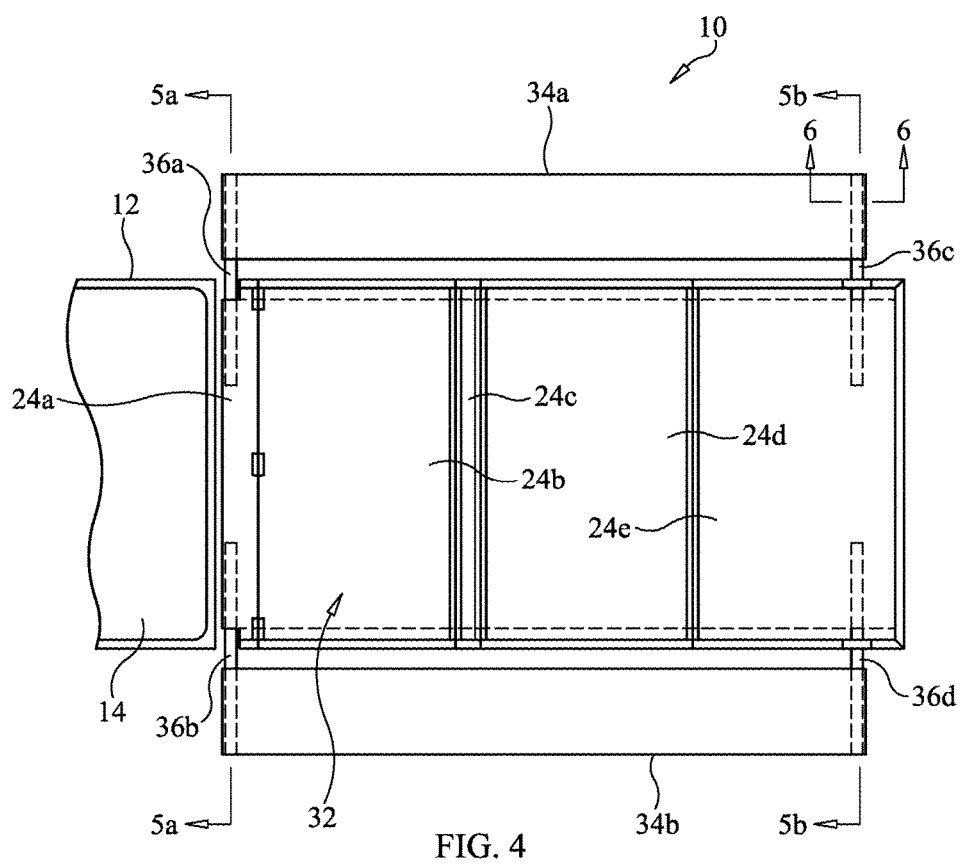
FIG. 4 is a top view of the truck bed cover with side extension panel constructed in accordance with an embodiment of the present invention.

Turning now to FIG. 4, the cover 10 includes a pair of deck extension side panels 34a and 34b that extend the deck surface 32 beyond the sides of the truck bed 16 to allow carrying loads that requires a greater deck surface width than what is provided by the cover panels 24a-24e alone. The deck extension side panels 34a and 34b are supported by and secured to deck extension support beams 36a-36d that extend outwardly from opposite sides of the main cover portion. More particularly, side panel 34a is supported at its opposite ends by support beams 36a and 36c and side panel 34b is supported at its opposite ends by support beams 36b and 36d.

Figure 5A:
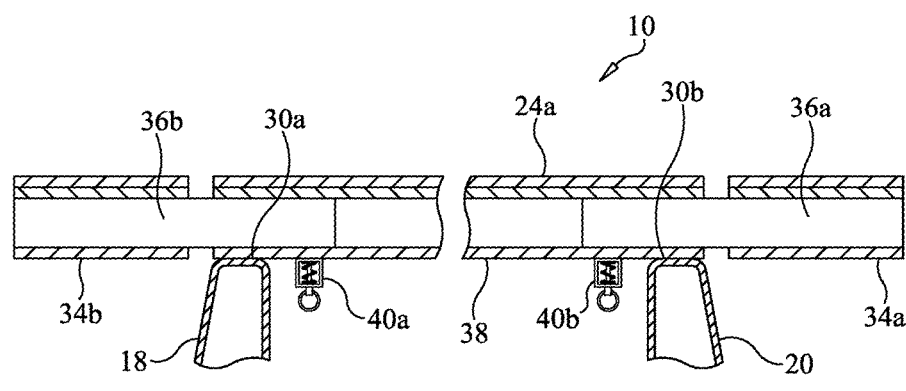
FIG. 5A is a cross-sectional view taken along line 5a-5a in FIG. 4.

With reference to FIG. 5A, support beams 36a and 36b are slidably received and supported by elongated member 38 that extends across the width of the truck bed and is supported at its opposite ends upon the upper edges 30a and 30b of the truck bed sidewalk 18 and 20. In the representatively illustrated embodiment, elongated member 38 is extends through panel 24a. The elongated member 38 is tubular shaped and support beam 36a is slidably received through a first end and support beam 36b is slidably received through an opposite end. The position of each support beam 36a and 36b relative to the elongated member 38 is selectively locked by spring pins 40a and 40b, respectively. As further depicted, the free end of support beam 36a is slidably received by a tubular member located at one end of extension panel 34a and the free end of support beam 36b is slidably received by a tubular member located at one end of extension panel 34b. To this end, the ends of the extension panels 34a and 34b are supported in a cantilever manner by the support beams 34a and 34b, respectively.

Figure 5B:
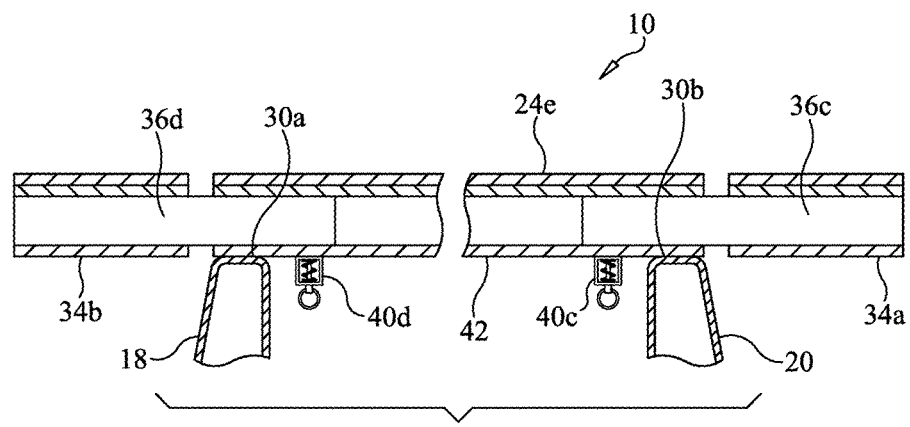
FIG. 5B is a cross-sectional view taken along line 5b-5b in FIG. 4.

Similarly, and with reference to FIG. 5B, support beams 36c and 36d are slidably received and supported by elongated member 42 that extends across the width of the truck bed and is supported at its opposite ends upon the upper edges 30a and 30b of the truck bed sidewalls 18 and 20. In the representatively illustrated embodiment, elongated member 42 is extends through panel 24e. The elongated member 42 is tubular shaped and support beam 36c is slidably received through a first end and support beam 36c is slidably received through an opposite end. The position of each support beam 36c and 36e relative to the elongated member 42 is selectively locked by spring pins 40c and 40d, respectively. As further depicted, the free end of support beam 36c is slidably received by a tubular member located at one end of extension panel 34a and the free end of support beam 36d is slidably received by a tubular member located at one end of extension panel 34b. To this end, the ends of the extension panels 34a and 34b are supported in a cantilever manner by the support beams 34c and 34d, respectively.

Figure 6:
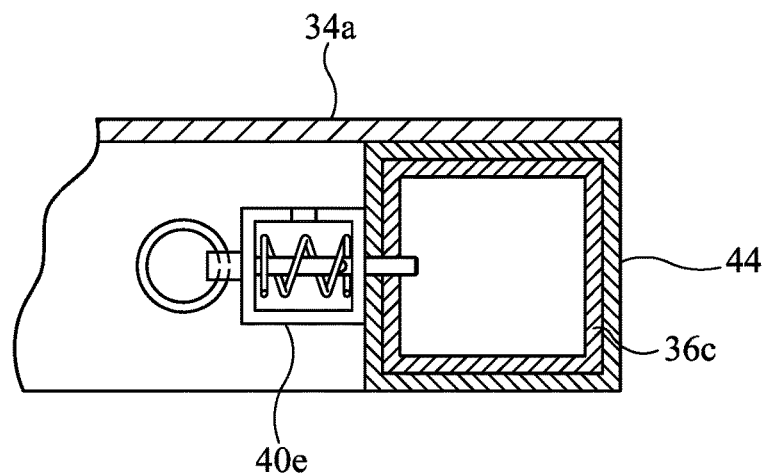
FIG. 6 is a cross-sectional view taken along line 6-6 in FIG. 4.

Turning to FIG. 6, there is shown a partial cross-section taken through support beam 36c and an end of extension panel 34a. As shown, support beam 36c is slidably received by tubular member 44 that is located at the end of extension panel 34a. The support beam 36c and the tubular member 44 are releasably secured together by spring pin 40e that extends through cooperating holes formed through the support beam 36c and the tubular member 44. While only support beam 36c and one end of extension panel 34a is described above and shown in FIG. 6, the arrangement is the same for each end of extensional panels 34a and 34b and the support beams 36a-36d.

Figure 7:
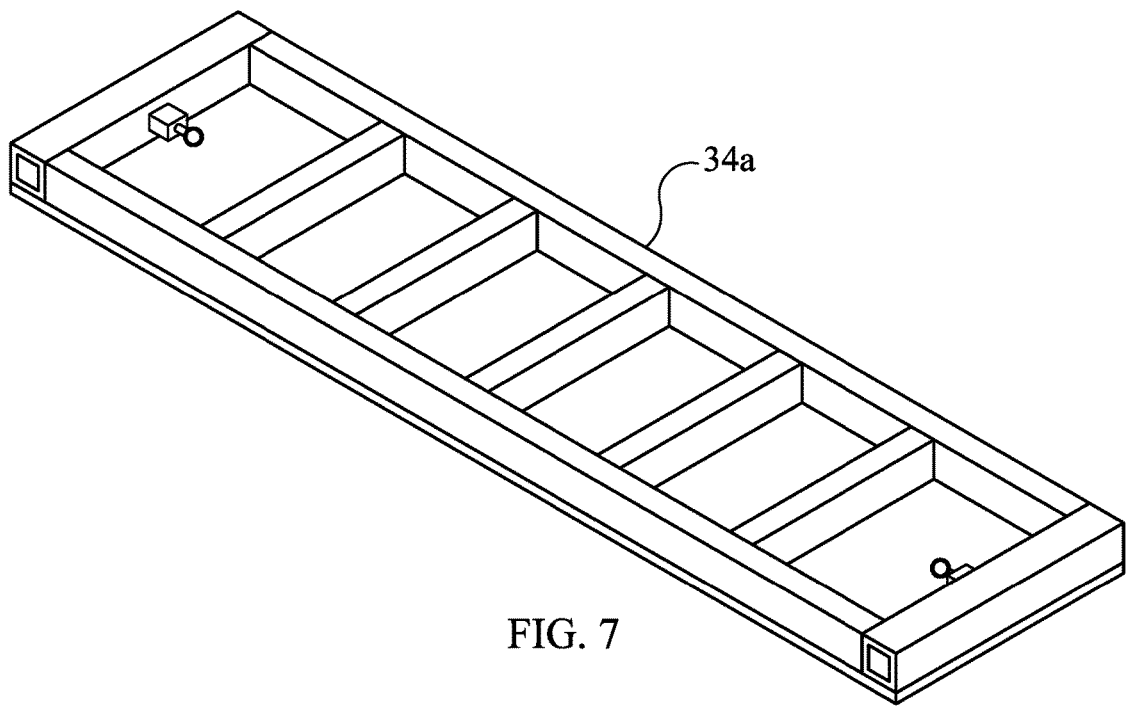
FIG. 7 is a bottom perspective view of a side extension panel of FIG. 4.

In FIG. 7, there is depicted a bottom perspective view of extension panel 34a illustrating its tubular frame construction. Extensional panel 34b has a similar construction and does not require illustration.

Figure 8:
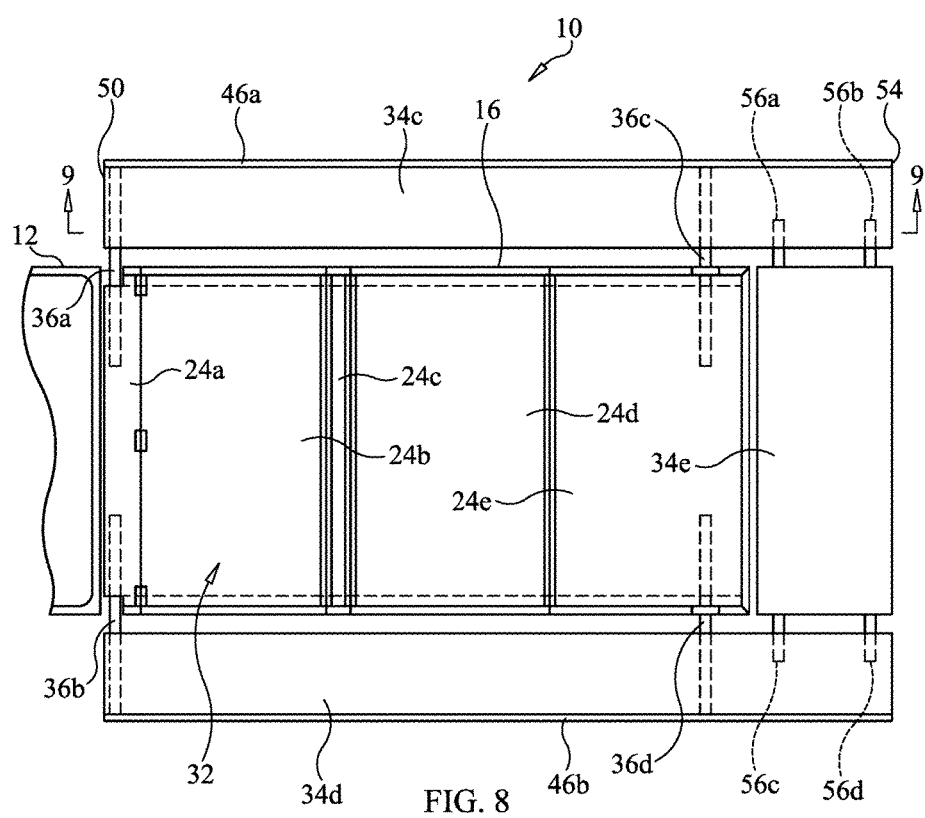
FIG. 8 is a top view of the truck bed cover with side extension panels and a rear extension panel constructed in accordance with an alternative embodiment of the present invention.

With reference to FIG. 8, an alternative deck extension configuration is shown, including deck extension side panels 34c and 34d, and deck extension rear panel 34e. This configuration is used when the deck surface 32 needs to be extended to the sides and rear of the main cover portion. And is particularly useful in transporting two snowmobiles or similar vehicles on the deck. Extension panels 34c and 34d are constructed like extension panels 34a and 34b, discussed above, with a few differences. For instance, extension panels 34c and 34d are longer to extend rearwardly beyond the end of the truck bed and are configured to support the rear panel 34e between their rearward ends. In addition, extension panels 34c and 34d have elevated side edge guards 46a and 46b, respectively, that prevent articles from slipping off the outer side edges. It is important to note, however, that extension panels 34a and 34b could also have similarly arranged side edge guards.

Figure 9:
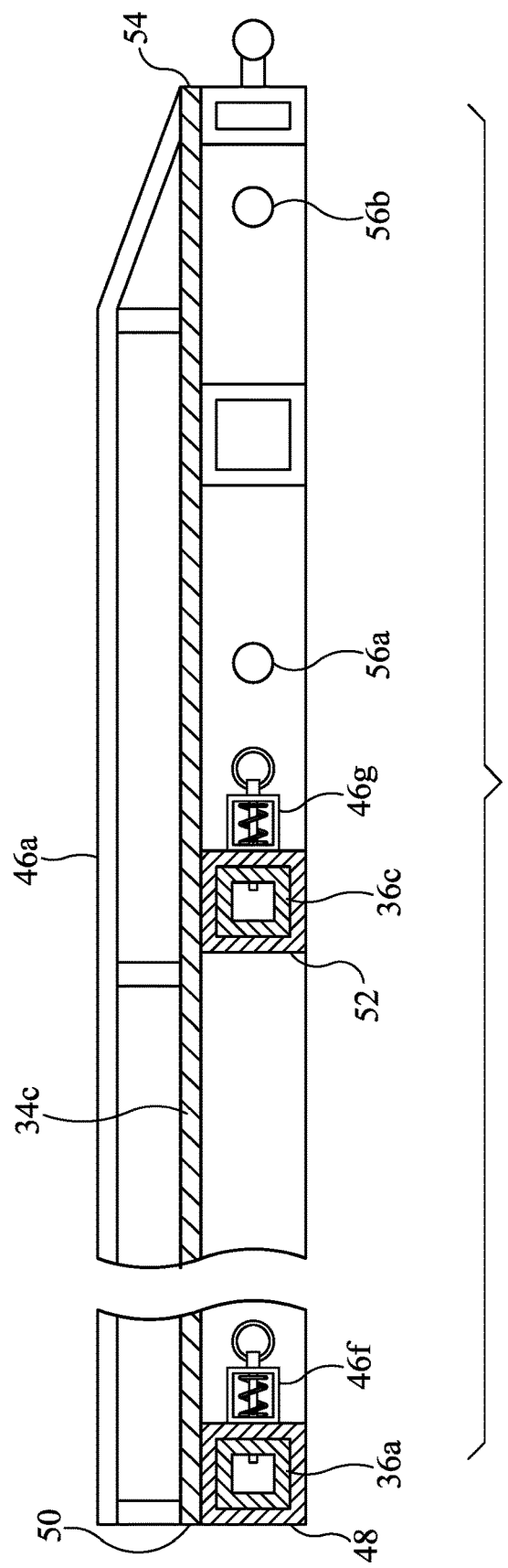
FIG. 9 is a cross-sectional view taken along line 9-9 in FIG. 8.

With further reference to FIG. 9, there is shown a side cross-sectional view of extension panel 34c mounted upon support beams 36a and 36c. Particularly, support beam 36a is slidingly received by tubular member 48 located at a forward end 50 and support beam 36c is slidingly received by tubular member 52 located toward rearward end 54. Spring pin 46f locks support beam 36a and tubular member 48 together and spring pin 46g locks support beam 36c and tubular member 50 together. The construction and engagement between extension panel 34e and support beams 36b and 36d is the same and does not require illustration.

Figure 10:
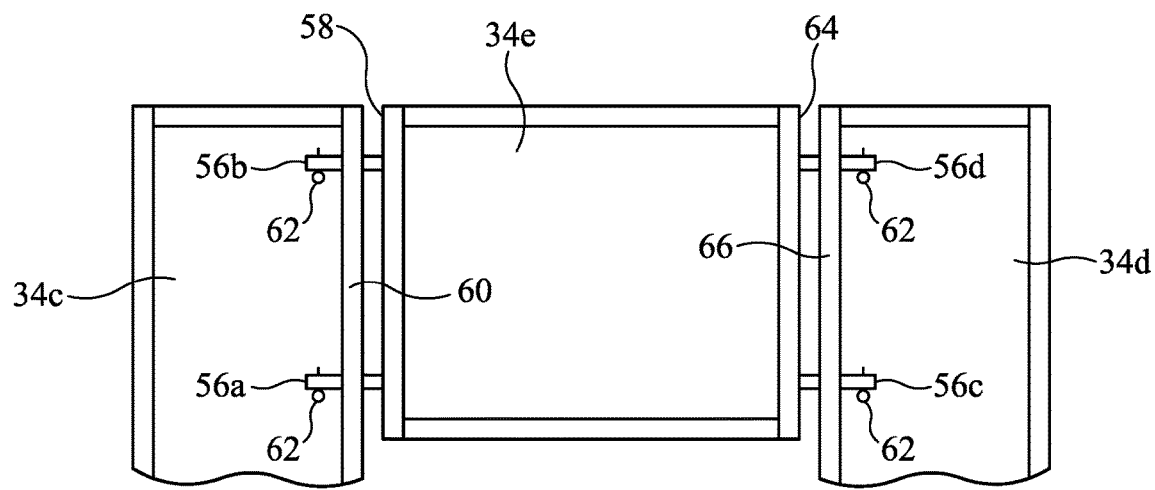
FIG. 10 is a bottom view of the side extension panels and rear extension panel of FIG. 8.

With reference to FIGS. 8 through 10, the rear extension panel 34e is disposed between the inward facing sides of side extension panels 34c and 34d at a location just rearward of the rear end of the truck bed. The rear extension panel 34e is supported and secured in place to the side extension panels 34c and 34d by coupling posts 56a-56d that extend from the sides of the rear extension panel and into the sides of the side extension panels. More particularly, in the representatively illustrated embodiment, coupling posts 56a and 56b extend from side 58 of the rear extension panel 34e and are received through corresponding holes formed through the side frame member 60 of side extension panel 34c. The coupling posts 56a and 56b are secured against withdrawing from the side frame member 60 by pins 62. Similarly, coupling posts 56c and 56d extend from side 64 of the rear extension panel 34e and are received through corresponding holes formed through the side frame member 66 of side extension panel 34d. The coupling posts 56c and 56d are secured against withdrawing from the side frame member 66 by pins 62.

Figure 11:
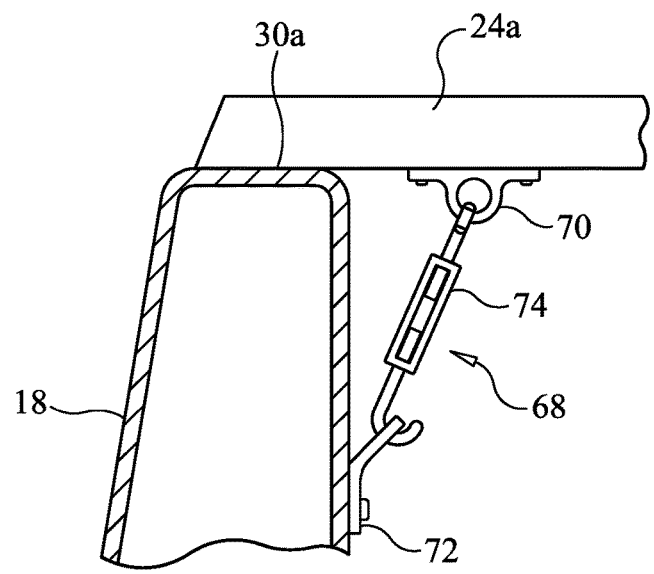
FIG. 11 is a partial cross-sectional view showing a panel section of the truck bed cover fixedly attached to the truck bed.

With reference to FIG. 11, panel section 24a is shown fixedly secured to the truck bed 16 by coupling 68. In the representatively illustrated embodiment, coupling 68 includes an tiedown 70 attached to the panel section 24a and a tiedown 72 attached to the sidewall 18 of the truck bed 16, and a turnbuckle 74 connected to both tiedowns. It is to be understood that while only one side of the panel section 24a and only sidewall 18 of the truck bed 16 is shown, the opposite side is secured in the same manner and does not require illustration.

Figure 12:
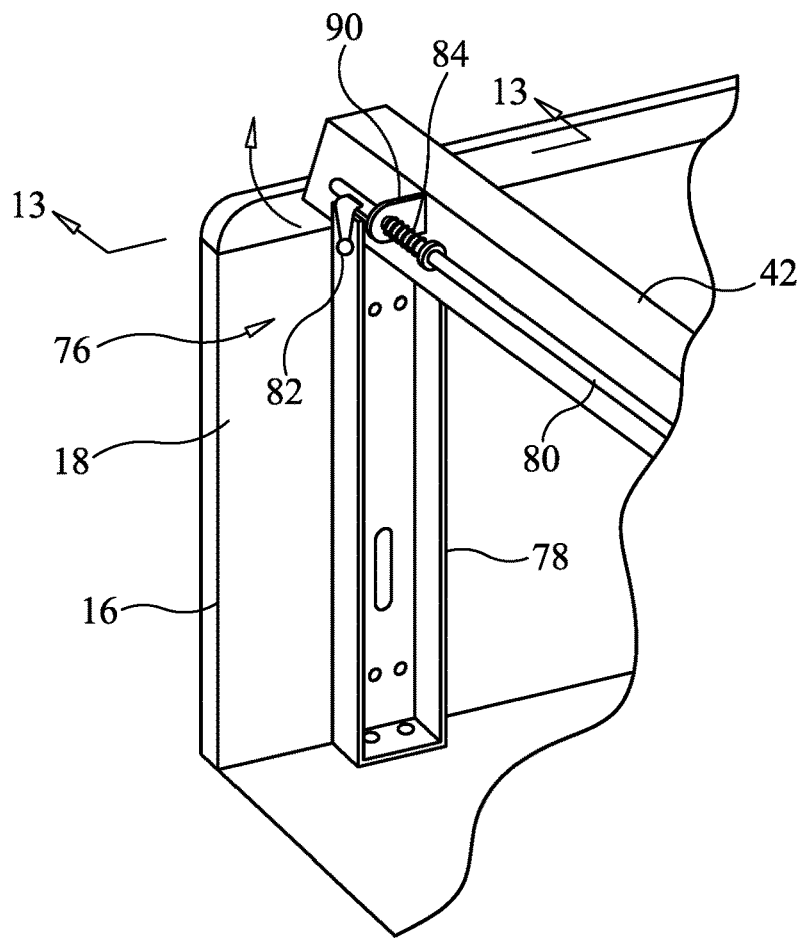
FIG. 12 is a partial perspective view of a coupling between an elongated member of the truck bed cover and the truck bed.
Figure 13:
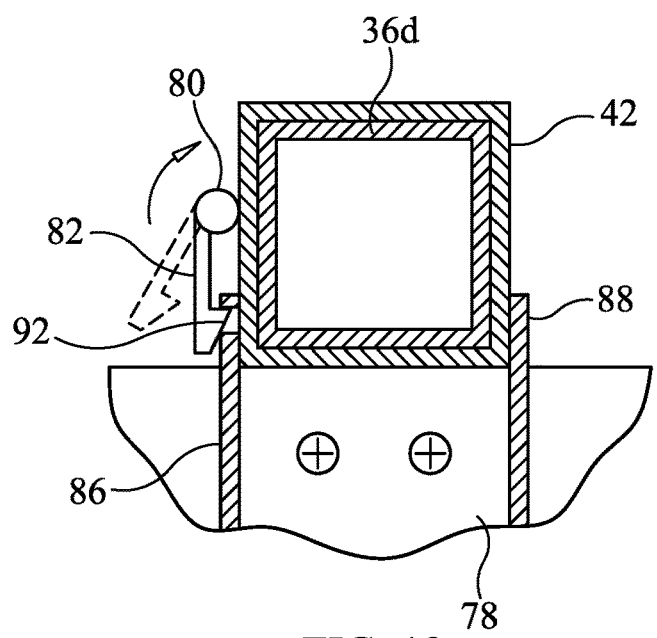
FIG. 13 is a cross-sectional view taken along line 13-13 in FIG. 12.

Turning now to FIGS. 12 and 13, there is shown a perspective view of an end of elongated member 42 secured to the truck bed 16 by coupling 76. It is important to note that while only one side of coupling 76 and member 42 is illustrated, the opposite side is identically constructed. Coupling 76 operates to releasably secure the elongated member 42 to the truck bed 16. In certain aspect, discussed below, it is desirable to fold panel section 24e while member 42 remains secured to the truck bed 16, for example when the side extension panels are in use, and access to the truck bed is desired.

In the representatively illustrated embodiment, coupling 76 includes bed brackets 78 (one secured to each side of the bed), latch bar 80, latch 82, and torsion spring 84. Each bed bracket 78 is secured to the interior side of the truck bed sidewalls and includes a pair of upstanding tabs 86 and 88 that are spaced apart and between which the elongated member 42 is removably received in downward direction. Latch bar 80 extends along the length of the elongated member and is mounted at its opposite ends by a tang 90 for rotation about its longitudinal axes, which runs parallel to the elongated member. Latch 82 is conjoined with end of the latch bar 80 and is removably received by opening 92 formed through tab 86. Latch 82 is spring biased into the locked position in the opening 92 by the torsion spring 84 that operates to rotate the latch bar 80 in a first rotational direction. The spring force provided by spring 84 can be overcome by rotating the latch bar 80 in a second rotational direction, thereby removing latch 82 from the opening 92 and unlocking the coupling 76.

Figure 14:
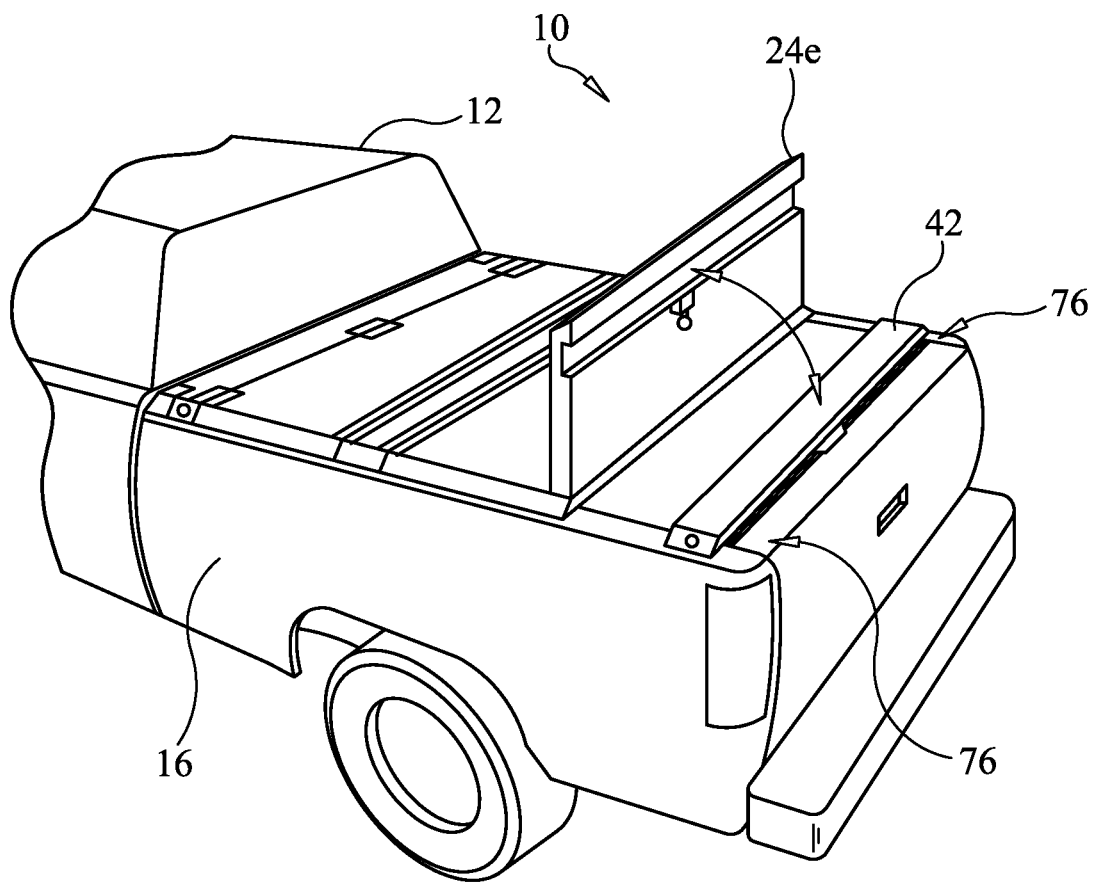
FIG. 14 is a perspective view of the truck bed cover with the rear most panel shown in a partially folded and disconnected from an elongated member.

With reference to FIG. 14, the cover 10 is shown with panel section 24e detached from elongated member 42 and in a partially rotated position with member 42 securely attached to the truck bed 16 by couplings 76. In such a configuration, the panel sections may be folded or rotated into the retracted or open position to allow access to the truck bed 16 without requiring disconnecting member 42 from the truck bed. Panel section 24e is detachably connected to the elongated member 42 by spring pin 46h that engages a hole formed through the elongated member, as seen in FIG. 15.

Figure 15:
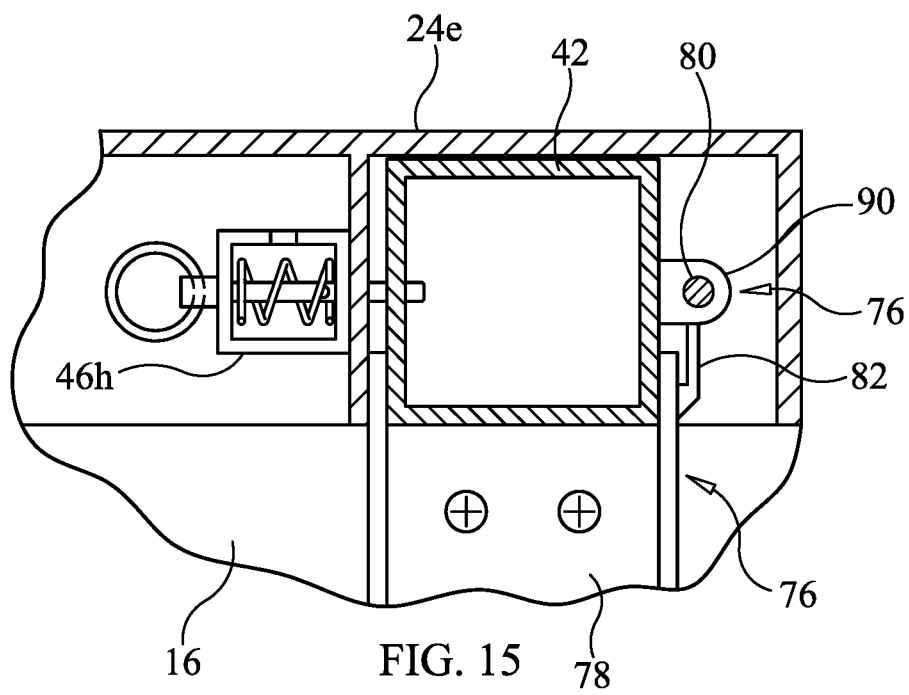
FIG. 15 is a cross-sectional view taken along line 15-15 in FIG. 1.

Also, depicted in FIG. 15, is the coupling 76 located at the opposite end of the elongated member 42 and opposite side of the truck bed 16 from which was discussed above and shown in FIGS. 12 and 13.

A number of embodiments of the present invention have been described. Nevertheless, it will be understood that various modifications may be made without departing from the spirit and scope of the invention. Accordingly, other embodiments are within the scope of the following claims.

What is claimed is:

1. A load supporting truck bed cover for covering a bed of a pickup truck, the bed having a front end, a rear end, and a pair of sidewalls extending between the front and rear ends, each of the sidewalls having an upper edge, the truck bed cover comprising:
a plurality of rigid panel sections, each having a pair of lateral sides and a width extending between said pair of lateral sides, wherein each rigid panel section of said plurality of rigid panel sections being selectively positioned on the upper edges of the sidewalls such that said width of each rigid panel section extends across the bed and across at least a portion of each upper edge of the sidewalls;
wherein adjacent rigid panel sections are hingedly connected such that two or more rigid panel sections of said plurality of rigid panel sections are pivotable about axes perpendicular to the sidewalls of the bed between a closed position where the bed is covered and an open position where the bed is open;
a first elongated member having a length and opposite first and second ends, said first elongated member being selectively positioned on the upper edges of the sidewalls such that said length of said first elongated member extends across the bed and across at least a portion of each upper edge of the sidewalk;
a first extension beam having a length, said first extension beam slidably connected to said first elongated member and selectively positionable in extended and retracted positions relative to said first end of said first elongated member;
a second extension beam having a length, said second extension beam slidably connected to said first elongated member and selectively positionable in extended and retracted positions relative to said second end of said first elongated member;
a second elongated member having a length and opposite first and second ends, said second elongated member being selectively positioned on the upper edges of the sidewalls such that said length of said second elongated member extends across the bed and across at least a portion of each upper edge of the sidewalls;
a third extension beam having a length, said third extension member slidably connected to said second elongated member and selectively positionable in extended and retracted positions relative to said first end of said second elongated member; and a fourth extension beam having a length, said fourth extension member slidably connected to said second elongated member and selectively positionable in extended and retracted positions relative to said second end of said second elongated member.

2. The truck bed cover of claim 1, wherein said first elongated member is tubular and said first extension beam is slidably received by said first elongated member through said first end thereof and said second extension beam is slidably received by said first elongated member through said second end thereof; and wherein said second elongated member is tubular and said third extension beam is slidably received by said second elongated member through said first end thereof and said fourth extension beam is slidably received by said second elongated member through said second end thereof.

3. The truck bed of claim 1, further comprising:
a first and second side extension panels, each having a front end and a rear end;
wherein said first side extension panel being removably supported at its front end by said first extension beam and at its rear end by said third extension beam; and
wherein said second side extension panel being removably supports at its front end by said second extension beam and at its rear end by said fourth extension beam.

4. The truck bed of claim 3, further comprising:
a rear extension panel, said rear extension member being removably support at opposite sides thereof by said first and second side extension panels with said rear extension member extending between said first and second side extension panels.

5. The truck bed of claim 1, wherein said second elongated member is detachably connectable to one rigid panel section of said plurality of rigid panel sections.

6. A load supporting truck bed cover for covering a bed of a pickup truck, the bed having a front end, a rear end, and a pair of sidewalls extending between the front and rear ends, each of the sidewalls having an upper edge, the truck bed cover comprising:

a plurality of rigid panel sections, each having a pair of lateral sides and a width extending between said pair of lateral sides, wherein each rigid panel section of said plurality of rigid panel sections being selectively positioned on the upper edges of the sidewalls such that said width of each rigid panel section extends across the bed and across at least a portion of each upper edge of the sidewalls;

a first rigid panel section of said plurality of id panel sections is disposed at the front end of the bed and is fixedly connected to the bed;

wherein adjacent rigid panel sections are hingedly connected such that two or more rigid panel sections of said plurality of rigid panel sections are pivotable about axes perpendicular to the sidewalls of the bed between a closed position where the bed is covered and an open position where the bed is open;

a first elongated member having a length and opposite first and second ends, said first elongated member being selectively positioned on the upper edges of the sidewalls such that said length of said first elongated member extends across the bed and across at least a portion of each upper edge of the sidewalls, and wherein said first elongated member extends across said first rigid panel section;

a first extension beam having a length, said first extension beam slidably connected to said first elongated member and selectively positionable in extended and retracted positions relative to said first end of said first elongated member;

a second extension beam having a length, said second extension beam slidably connected to said first elongated member and selectively positionable in extended and retracted positions relative to said second end of said first elongated member;

a second elongated member having a length and opposite first and second ends, said second elongated member being selectively positioned on the upper edges of the sidewalls such that said length of said second elongated member extends across the bed and across at least a portion of each upper edge of the sidewalls;

a third extension beam having a length, said third extension member slidably connected to said second elongated member and selectively positionable in extended and retracted positions relative to said first end of said second elongated member; and a fourth extension beam having a length, said fourth extension member slidably connected to said second elongated member and selectively positionable in extended and retracted positions relative to said second end of said second elongated member.

7. The truck bed cover of claim 6, wherein said first elongated member is tubular and said first extension beam is slidably received by said first elongated member through said first end thereof and said second extension beam is slidably received by said first elongated member through said second end thereof; and wherein said second elongated member is tubular and said third extension beam is slidably received by said second elongated member through said first end thereof and said fourth extension beam is slidably received by said second elongated member through said second end thereof.

8. The truck bed of claim 6, further comprising:
a first and second side extension panels, each having a front end and a rear end;
wherein said first side extension panel being removably supported at its front end by said first extension beam and at its rear end by said third extension beam; and
wherein said second side extension panel being removably supports at its front end by said second extension beam and at its rear end by said fourth extension beam.

9. The truck bed of claim 8, further comprising:
a rear extension panel, said rear extension member being removably support at opposite sides thereof by said first and second side extension panels with said rear extension member extending between said first and second side extension panels.

10. The truck bed of claim 6, wherein said second elongated member is detachably connectable to a second rigid panel section of said plurality of rigid panel sections.

* * * * *